United States Patent [19]
Peters

[11] Patent Number: 5,188,314
[45] Date of Patent: Feb. 23, 1993

[54] BALLOON HOLDING DEVICE

[76] Inventor: William H. Peters, P.O. Box 814, County Rd. I-50, West Unity, Williams County, Ohio 43570

[21] Appl. No.: 681,931

[22] Filed: Apr. 8, 1991

[51] Int. Cl.$^5$ .................... B64B 1/50; A63H 27/10
[52] U.S. Cl. ................................ 244/31; 242/129; 242/96; 242/85.1; 446/220; 188/65.1
[58] Field of Search .................. 244/31; 242/129, 96, 242/85.1; 40/214; 446/220; 188/69.1

[56] References Cited

U.S. PATENT DOCUMENTS

| | | | |
|---|---|---|---|
| 1,890,945 | 12/1932 | Hormel | 242/129 |
| 2,533,731 | 12/1950 | Gomberg | 242/129 |
| 2,626,762 | 1/1953 | Zick | 242/85.1 |
| 2,678,778 | 5/1951 | Gibson | 242/85.1 |
| 2,824,709 | 2/1958 | Macy | 242/129 |
| 2,875,981 | 3/1959 | Hunter | 188/65.1 |
| 4,688,739 | 8/1987 | Moore | 242/85.1 |
| 5,011,447 | 4/1991 | Watanabe | 446/220 |

Primary Examiner—Galen Barefoot
Attorney, Agent, or Firm—George R. Royer

[57] ABSTRACT

The subject device is a balloon weight and holding device having and storing a balloon tether means and adapted to be attached to a balloon and functioning to prevent a balloon filled with a lighter-than-air gas from rising above a given tethered length, such device comprising in general a spool member having a central cylindrical shaft flanked on each end by opposing circular plate members, each such plate having a circumferential rim. The spool member has the balloon tether wrapped around it to be unravelled at will. Integrally disposed between the inner face of such circular plate members are integrally affixed means to retard the process of unravelling of the balloon string so that the balloon string and thus the balloon do not become beyond the control of the person holding the balloon. An additional function of the subject device is such that if the balloon escapes the clutches of the holder, the balloon weight device will function as an anchor hold-down in order to prevent the balloon rising uncontrollably into the atmosphere.

4 Claims, 1 Drawing Sheet

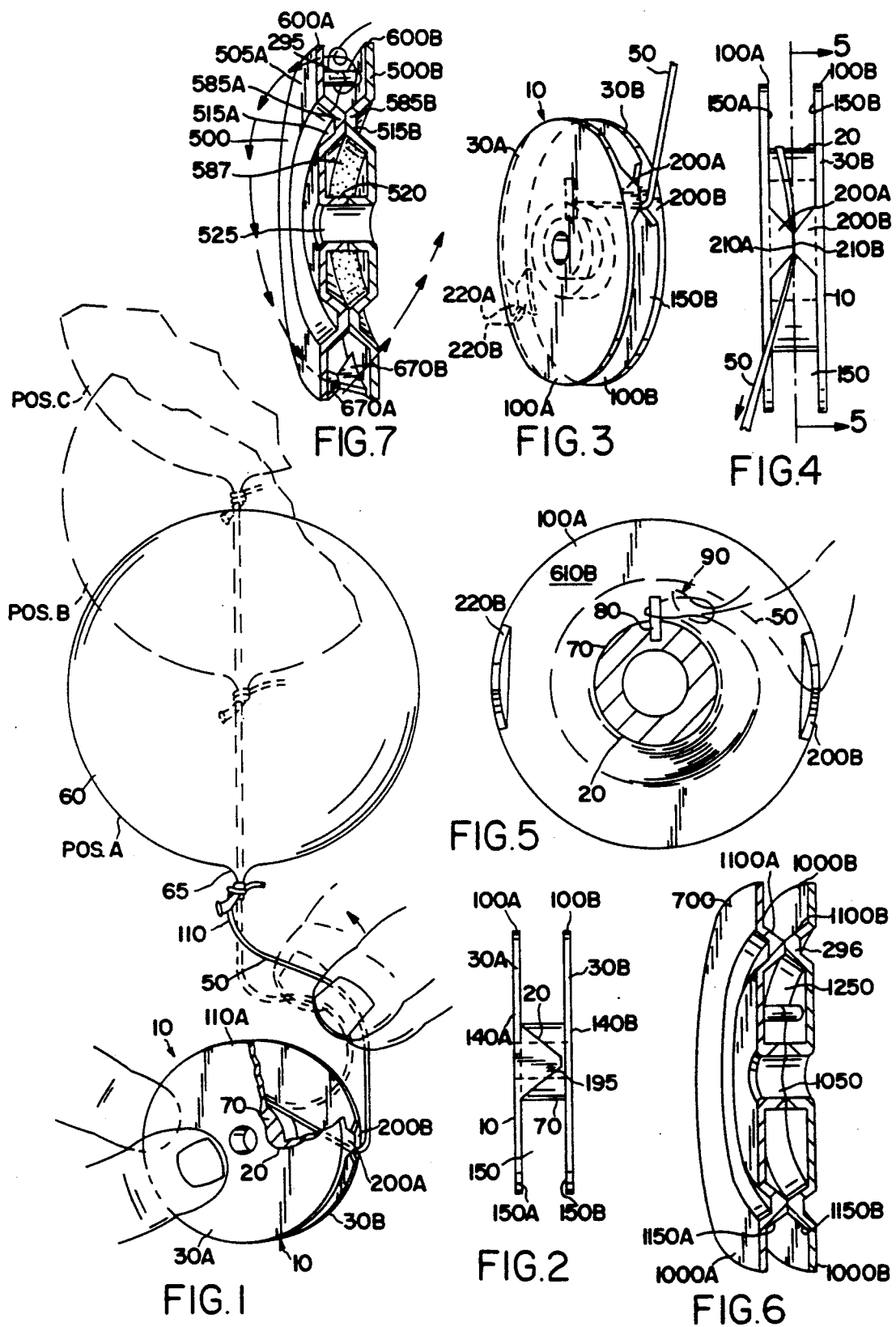

BALLOON HOLDING DEVICE

DISCUSSION OF PRIOR ART AND BACKGROUND OF INVENTION

The subject device pertains to devices that are deployed and used on balloons to help keep a balloon under control to ensure that the balloon does not rise above a given tethered length and rise uncontrollably into the air. In general, the overall array of prior art devices falls within the area of balloon holding devices that are structured and deployed to prevent balloons from escaping from the grasp of the holder.

In this latter respect, balloons are frequently filled with helium or similar lighter-than-air gases to allow the balloon to rise upwardly in the air. Usually, balloons are frequently used as novelties for children and are held by a tethered string so that the balloon does not rise out of control into the air. In this respect, a growing problem with the use of such balloons is that they frequently escape the clutches of the holder and rise upwardly out of control in a free floating manner into the lower atmosphere. Specifically, when such balloons free-fly in the lower atmosphere, they can cause interference problems with air traffic, power lines, as well as causing other problems in the lower atmosphere. Yet other problems occur whenever the balloon breaks and falls to the ground. Over a significant period of time, with a large number of deflated balloons free-falling from the atmosphere, scattered at random over the landscape, pollution problems have occurred. A subsidiary problem arises when animals attempt to consume deflated balloons on the ground.

Both the airborne interference problems and the resultant ground pollution problems caused by proliferation of balloons have caused many governmental bodies to pass legislation restricting the usage of such balloons. Several states have passed legislation requiring that helium-filled balloons be equipped with an integrally-affixed tether line that may not exceed a given length. The purpose, obviously, of such requirements is to help ensure that the balloon does not fly uncontrollably into the air. While the requirements and use of such a tether line is not an assurance against the upwardly escape of balloons, it can help the problem significantly. Other measures are being contemplated to help alleviate the problem, however, the tether line requirement appears to be the most widely adapted remedy.

One of the problems encountered with the use of tether lines is the fixed length of the line. In many instances, with the line affixed to the balloon stem, a person holding the balloon line may not want to have the balloon rise up the distance of the line, but rather at a lesser distance in order to maintain the balloon under optimal control. In such circumstances, means are needed to permit the balloon user to adjust the tether line length and yet still restrict the tether line extension to the mandated limit. In short, means are needed, particularly in the case of children, to provide some means to prevent the balloon string from unravelling uncontrollably to its tethered length. Under such circumstances the balloon user may tent to lose control of the balloon.

No known balloon stem or tether line holders are known in the prior art to accomplish such an objective, and the subject apparatus is conceived as a device to accomplish same so as to control the upward projection of the tether string. Therefore, the following objects of the subject invention are directed accordingly.

OBJECTS

It is an object of the subject invention to provide an improved balloon holder;

It is also an object of the subject invention to provide an improved device for holding balloon stems;

Still another object of the subject invention is to provide an improved apparatus for controlling balloon strings;

Another object of the subject invention is to provide an improved balloon string holder;

Yet another object of the subject invention is to provide an improved multiple purpose tether storage device that can be used for holding multiple balloons at variable heights;

Another object of the subject invention is to provide a self-storing device for the tether portion of a balloon;

Yet another object of the subject invention is to provide means of recovering excess portions of a balloon tether to reduce the tethered height of a balloon without reducing the length of the tether;

Yet another object of the subject invention is to provide an improved balloon holding device;

A further object of the invention herein is to provide control means for holding a balloon on a string;

Another object of the subject invention is to provide a variable dispensing device of a balloon tether portion of a balloon;

Another object of the subject invention is to provide a self-storing spool for a balloon tether that can be recycled;

Other and further objects of the subject invention will become apparent from a reading of the following description taken in conjunction with the claims.

DRAWINGS

FIG. 1 is a perspective view of the subject device shown partially cut away, demonstrating how it is adapted to hold a balloon string;

FIG. 2 is an elevational view of the subject device;

FIG. 3 is a perspective view of the subject device showing how a balloon string is affixed thereon;

FIG. 4 is a side elevational view of the subject device;

FIG. 5 is a top elevational view of the subject device;

FIG. 6 is a perspective view of an alternative arrangement of the subject device shown partially cut away;

FIG. 7 is a perspective view partially cut away of an alternate embodiment of the subject invention.

DESCRIPTION OF PREFERRED EMBODIMENT

The subject device is a balloon holding device having sufficient weight to function as a balloon holding device adapted to be attached to a balloon tether and functioning to prevent a balloon filled with a lighter-than-air gas from rising above a given tethered length, such device comprising in general a spool member having a central cylindrical shaft flanked on each end by opposing circular plate members, each such plate having a circumferential rim. The spool member is adapted to have the balloon tether member wrapped around it to be unravelled or rewound at will. Integrally disposed between the inner face of such circular plate members are integrally affixed means to partially retard the process of unravelling of the balloon stem so that the balloon string and thus the balloon do not travel beyond the control of the person holding the balloon.

In describing the preferred embodiment of the subject invention, it is to be stressed that the following description is of only one embodiment and that other embodiments may fall within the scope of the subject invention.

Referring now to the drawings, and particularly FIGS. 1, 2, 3 and 4, in which a preferred embodiment of the subject invention is shown. As seen in the drawings, the subject device, in general, functions as a balloon string and tether holder and is basically in its general form shaped as a spool member 10 having an internal cylindrically-shaped spindle 20 that is substantially reduced in diameter relative to the outer shield portion 30A and 30B. While this relative diametric difference between the spindle 20 diameter and the outer shield portions 30A and 30B is substantial, as shown in the preferred embodiment, other embodiments of the subject invention may incorporate less of a diametric difference between the spindle 20, and the outer shield portions 30A and 30B still fall within the scope of the subject invention.

In the most basic and general embodiment of the subject invention, the spool member is attached to and holds a portion of a tether tape member or a string-like member wound concentrically around the spindle 20 to be unravelled or recovered to allow a tethered balloon 60 to rise to a limited distance.

More particularly, the device is the basic device is a spool member affixed to and around which is wound a string, tape, or similar tether line 50 which is affixed to the balloon stem, with the spool member having integrated means thereon, as discussed below, to retard uncontrolled unravelling of the tether line and thus control the balloon's ascent and potentially prevent escape of the balloon into the air. Other attributes of the device and invention, as alternate embodiments, are also set forth below.

A review of FIGS. 1, 2, 3 and 4 reveals the outer circumferential surface 70 of the spindle 20 of the spool member 10 is regularly shaped in a cylindrical configuration, and formed into this outer circumferential surface 70 is a detented slot 80 into which the first end 90 of the tether line 50 is integrally affixed, by heat fusion means, or other means. That portion of the tether line that is immediately adjacent to the first end of the tether line is wound around the other circumferential surface of the spindle 20 in a concentric manner, with the remaining portions of the tether line extending out beyond the spindle diameter and thence beyond the circumferential limits of the spool 10 formed by the outer circumferential edges 100A and 100B of the spool rim members 30A and 30B respectively. The distal or second end 110 of the tether line is affixed to the stem 65 of balloon 60. It is to be stressed that while the embodiments shown in the drawings demonstrate the usage of tape means as a tether line, it is consistent with the application of this invention to use string or similar materials for the tether line.

As can be seen from FIGS. 1, 2, 3 and 4, the circumferential rims 30A and 30B that flank the first and second ends 130A and 130B of the spindle 20 are relatively thin disc-like members, each having an outer circumferential edge 100A and 100B respectively, as shown in the drawings. Also, as can be seen from the drawings, it is clear that each rim member 30A and 30B has an outer face 140A and 140B respectively, as well as inner faces 150A and 150B. As can be determined from a review of the drawings, innerfaces 150A and 150B of the rim members 30A and 30B face one another in a spaced distance relationship, such space forming the internal spatial area 155 of the spool member, such spatial area extending between the respective inner faces 150A and 150B of the rim members 30A and 30B, and extending radially outwardly from the spindle 20 to the circumferential edges 100A and 100B. In the most general form of the invention, integrally disposed inside the spatial area 155 are means adapted to retard the uncontrolled unravelling of the tether line. In the basic form of the invention and the most general embodiment, two opposing stop members 200A and 200B are integrally affixed into the opposing faces 150A and 150B. More particularly, each of two opposing stop members 200A and 200B are formed as triangularly-shaped members with th base of the triangle, in each case, being affixed integrally to a portion of the inner face 150A and 150B of the rim members 30A and 30B respectively. Thus, as can be seen from the drawings, the stop member 200A is affixed at the base to inner surface 200A with the point apex 210A thereof projecting away from the inner face 140A, while the stop member 200B is affixed and juxtaposed in a position to the inner face 150B just opposite to and pointing directly to the stop member 200A. In similar fashion, the triangular stop member 200B is affixed with the base to the inner face 150B with its pointed apex 210B pointed and aligned with the apex 210A of the stop member 200A. In the preferred embodiment of the subject invention, the two pointed apices 210A and 210B of the stop member, abutting against one another, sufficient clearance is permitted by the flexing of the sides 150A and 150B when tether line 60 is pulled to permit tether line 60 to be pulled between the two apices 210A and 210B, but in a restricted manner that requires a tug to have it pulled through.

In the embodiment shown in the drawings, a second set of opposing stop members 220A and 220B can be deployed, and for purposes of implementing the subject invention, and retaining its tether member or members within the confines of disc 150A and 150B, there is no limit on the number of stop members that may be used. Moreover, in the preferred embodiment, the opposing stop members 200A and 200B are affixed in a position that is adjacent to or close to the circumferential edges 140A and 140B of the rim members 30A and 30B so that the flat outer faces 240A and 240B of the stop members 200A and 200B respectively face outwardly in a radial 18 direction and/or substantially parallel to a tangent on the outer 18A adjoining circumferential edge 140A and 140B, as seen. Thus, when the tape is drawn in an abutment relationship against one pair of opposing teeth members, the tether line is stopped from any further unravelling. As can be seen, the tether line can only pass between the respective apices of a given pair of teeth members when it is laid flat and passes in a threading manner between the respective teeth, thus retarding its movement. In another arrangement as shown in FIG. 2, one stop member 195 is employed and is adapted to abut again opposing face 150B, being fixed on upper face 150A.

In the embodiments shown in the drawings and particularly FIG. 7, there is shown an alternate embodiment to the invention. Particularly, in the embodiment shown in FIG. 6, the spool member 500 is constructed in basically the same manner as spool 10 shown in FIGS. 1 and 2, however, the spool 500 has the following described differences.

As seen, the outer faces 505A and 505B of the rim members 505A and 505B have circular V-shaped depressions 515A and 515B therein, which circular indentations are seen as being depressed V-shaped members that are spaced away from the central axis of the spool 500. As can be seen from the drawings, the depressions 515A and 515B extend inwardly into the inner spatial area between the rim members 505A and 505B, as shown. As can be seen, the opposing sides of the depressions that are formed inside the spatial area between the opposing rim members formed two opposing circular tooth-like members 585A and 585B that abut one another in a close contact relative to each other. As can be seen by this latter relationship, a circular enclosed space 587 is formed between the tooth-like members 585A and 585B. The purpose of this enclosed central spatial cavity is to hold the tether line inside, to keep it dirt free, with the opposing tooth members 585A and 585B helping to retard the uncontrolled, unravelling of the tether line. Also, as shown in the drawings, a post member 295 is placed between the rim members either outside the cavity as shown in FIG. 7 or inside thereof, as shown in FIG. 6.

Moreover, in the embodiment shown in the drawings, one of the internal ring-like tooth members 585A and 585B has an annular female groove 296 that is adapted to receive in mating fashion the opposing tooth member for optimal locking purposes. In either arrangement the internal spatial areas 587 and 1250 can be filled with a weighted material so as to provide a weighted device.

I claim:

1. A holder for the end of a balloon string for an inflatable balloon having a stem, such device comprising:
   (a) a spool member having an internal spindle of cylindrical configuration, such spool member having a barrel and a first end and a second end, with such spool member having a first circular rim and a second circular rim member integrally and concentrically joined respectively to said first end and said second end of the barrel of said spool member, with each such rim member being larger in diameter than the barrel of said spool member, and wherein each said rim member has an inner surface and an outer surface, as well as each rim member having an outer circumference with the barrel of said spool member being adapted to have a longitudinally extending string wrapped therearound in a concentrically spiralling manner;
   (b) string retardent means, comprising at least one pair of opposing projecting teeth integrally affixed to the respective opposing inner surfaces of the first and second rim member, and wherein said respective opposing teeth members are discrete members that extend integrally around a portion of the respective first circular rim member and second circular rim member in a circumferential manner less than the full circumferential distance of each of the first circular rim member and second circular rim member.

2. A holder for the end of a balloon string for an inflatable balloon having a stem, such device comprising:
   (a) a spool member having an internal barrel of cylindrical configuration, such spool member having a first end and a second end, with such spool member having a first rim member and a second rim member integrally and concentrically joined respectively to said first end and said second end of the barrel of such spool member, with each such rim member being larger in diameter than the barrel member of said spool member, and wherein each said rim member has an inner surface and an outer surface and each rim member having an outer circumference, with said barrel of said spool member adapted to have a balloon string wrapped circumferentially around said barrel of said spool member;
   (b) opposing tooth means, comprising at least one pair of opposing projecting tooth means with one such tooth means being integrally affixed to the inner surface of the first rim member and the second such tooth means being integrally affixed to the inner surface of the second rim member, and wherein said two members are aligned with each other with those portions of the two tooth members that face one another being flat and minimal contact with each other and wherein said respective opposing tooth members are discrete members that extend integrally around a portion of the respective first circular rim member and second circular rim member in a circumferential manner less than the full circumferential distance of each of the first circular rim member and second circular rim member.

3. A holder for the end of a balloon string for an inflatable balloon having a stem, such device comprising:
   (a) a spool member having an internal spindle barrel of cylindrical configuration, such spool member having a first end and second end, with such spool member each having a first circular rim member, and a second circular rim member integrally and concentrically joined respectively to said first end and said second end of the spindle barrel of such spool member, with each such rim member being larger in diameter than the spindle barrel member, and wherein said rim member has an inner surface and an outer surface, as well as each such rim member having an outer circumference with the spindle barrel member being adapted to have a balloon string with a free end wrapped circumferentially therearound;
   (b) abutment means, comprising at least one pair of opposing projecting teeth members with each of such opposing teeth members being integrally affixed to the respective opposing inner surfaces of the first circular rim member and second circular rim member, and wherein said respectively opposing teeth members are discrete members that extend integrally around a portion of the respective first circular rim member and second circular rim member in a circumferential manner less than the full circumferential distance of each of the first circular rim member and second circular rim member and wherein said opposing teeth members are triangular in configuration with the aspices of such triangular teeth members abutting one another in a mutually contacting manner, with such opposing teeth members adapted to retard, between such opposing teeth members a part of an unwrapped portion of the balloon string.

4. A holder for the end of a balloon string for an inflatable balloon having a stem, such device comprising:
   (a) a spool member having an internal spindle of cylindrical configuration, such spool member having a first end and second end, with such spool member having a circular rim member integrally and concentrically joined to each f aid first end and said second end of the spindle of such spool member, with each such rim member being larger in diameter than the barrel member, and wherein said rim member has an inner surface and an outer surface, as well as each rim member having an outer circumference with the spindle of said spool member being adapted to receive in circumferential fashion a balloon string;

(b) abutment means, comprising at least one tooth member integrally affixed to either of the respective opposing inner surfaces of the first and second rim member, and wherein said tooth member is triangular in configuration with the apex of such tooth member abutting against the opposing inner surface of the opposing rim member from which such tooth member is affixed with such abutment of such apex point of such tooth adapted to retard the unwinding of the balloon string, and wherein said respective tooth member is a discrete member that extends integrally around a portion of the respective first circular rim member in a circumferential manner less than the full circumferential distance of the first circular rim member.

* * * * *